United States Patent
Amagasa

(10) Patent No.: US 9,403,508 B2
(45) Date of Patent: Aug. 2, 2016

(54) WIPER CONTROL METHOD AND WIPER CONTROL DEVICE

(71) Applicant: MITSUBA Corporation, Gunma (JP)

(72) Inventor: Toshiyuki Amagasa, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 0 days.

(21) Appl. No.: 14/411,652

(22) PCT Filed: Jul. 10, 2013

(86) PCT No.: PCT/JP2013/068813
§ 371 (c)(1),
(2) Date: Dec. 29, 2014

(87) PCT Pub. No.: WO2014/010616
PCT Pub. Date: Jan. 16, 2014

(65) Prior Publication Data
US 2015/0166014 A1 Jun. 18, 2015

(30) Foreign Application Priority Data
Jul. 12, 2012 (JP) .................. 2012-156190

(51) Int. Cl.
*B60S 1/08* (2006.01)
(52) U.S. Cl.
CPC ........... *B60S 1/0807* (2013.01); *B60S 1/08* (2013.01); *B60S 1/0814* (2013.01); *Y10S 318/02* (2013.01)
(58) Field of Classification Search
CPC ......... B60S 1/08; B60S 1/0814; Y10S 318/02
See application file for complete search history.

(56) References Cited

U.S. PATENT DOCUMENTS

| 4,663,575 A * | 5/1987 | Juzswik | B60S 1/0807 15/250.17 |
| 4,665,488 A * | 5/1987 | Graham | B60S 1/0814 15/250.12 |
| 4,705,997 A * | 11/1987 | Juzswik | H02P 7/0044 318/293 |
| 4,866,357 A * | 9/1989 | Miller | B60S 1/08 318/443 |

(Continued)

FOREIGN PATENT DOCUMENTS

| GB | 2311208 A * | 9/1997 | ............ B60S 1/0896 |
| JP | 2002-264776 | 9/2002 | |

(Continued)

OTHER PUBLICATIONS

Translation of WO 2011/138367 A1.*

(Continued)

*Primary Examiner* — Behrang Badii
*Assistant Examiner* — David Testardi
(74) *Attorney, Agent, or Firm* — Wenderoth, Lind & Ponack, L.L.P.

(57) ABSTRACT

An electric motor is subjected to PWM duty control based on a target speed (tgt spd) set according to a position of a wiper blade. After a deceleration start position of wiping operation, the electric motor is driven at a PWM duty value (sld sta duty×Ksd) obtained by multiplying a PWM duty value (sld sta duty) at the deceleration start position by a predetermined deceleration coefficient (Ksd) set according to the blade position. The deceleration coefficient (Ksd) is set according to the position of the wiper blade based on a ratio (tgt spd/pek tgt spd) between the target speed (pek tgt spd) of the wiper blade at the start of deceleration and the target speed (tgt spd) of the wiper blade.

12 Claims, 10 Drawing Sheets

(56) References Cited

U.S. PATENT DOCUMENTS

| | | | | |
|---|---|---|---|---|
| 5,355,061 | A * | 10/1994 | Forhan | B60S 1/08 318/259 |
| 5,486,747 | A * | 1/1996 | Welch | H02P 6/00 318/569 |
| 6,150,783 | A * | 11/2000 | Michenfelder | B60S 1/08 15/250.13 |
| 6,246,192 | B1 * | 6/2001 | Haass | H02P 5/00 318/112 |
| 6,249,098 | B1 * | 6/2001 | Miyazaki | B60S 1/08 15/250.12 |
| 2003/0213087 | A1 * | 11/2003 | Moein | B60S 1/0814 15/250.3 |
| 2013/0099711 | A1 * | 4/2013 | Bonnefous | H02P 7/00 318/446 |
| 2013/0162180 | A1 * | 6/2013 | Zimmer | B60S 1/08 318/286 |

FOREIGN PATENT DOCUMENTS

| | | | |
|---|---|---|---|
| JP | 2004196195 A | * | 7/2004 |
| JP | 2009029216 A | * | 2/2009 |
| JP | 2009-274576 | | 11/2009 |
| JP | 2010-173338 | | 8/2010 |
| WO | WO 03/045744 A1 | * | 6/2003 |
| WO | WO 2011/138367 A1 | * | 11/2011 |

OTHER PUBLICATIONS

Zill, Dennis G. et al., "Unit Circle Trigonometry", Chapter 3 of "Trigonometry", Jones & Bartlett Publishers, Dec. 16, 2010, pp. 123-178.*

Motorola MC33035 datasheet, "Brushless DC Motor Controller", Rev. 2, 1996, 25 pages.*

ControlsWiki, "Feedback control", Sep. 27, 2007, 14 pages.*

International Search Report (ISR) issued Oct. 1, 2013 in International (PCT) Application No. PCT/JP2013/068813.

English translation of the International Preliminary Report on Patentability and Written Opinion issued Jan. 22, 2015 in International (PCT) Application No. PCT/JP2013/068813.

* cited by examiner

WIPER CONTROL METHOD AND WIPER CONTROL DEVICE

TECHNICAL FIELD

The present invention relates to control technology of a vehicle wiper device mounted on a vehicle or the like and, more particularly, to stabilization of wiping movement near an inversion position.

BACKGROUND ART

There has been widely used a system that detects a current position of a wiper blade on a glass surface and makes the wiper blade perform reciprocating wiping operation between an upper inversion position and a lower inversion position based on the detection data. As a control mode in such a wiper system, there is known a method that uses an elapsed time from an inversion position, angle information of a motor shaft, a count number of pulses output with motor rotation, and the like (hereinafter, abbreviated as "elapsed time, etc.") to detect a blade position and controls a wiper motor based on the detected blade position. In this method, for example, the elapsed time, etc., and the blade position (angle) are previously associated with each other and, thereby, a current position of the blade is detected based on the elapsed time, etc. Then, a target speed is set based on the detected blade position, and a motor is feedback-controlled according to the set target speed, whereby the wiper blade is reciprocated at a predetermined wiping cycle.

CITATION LIST

Patent Document

[Patent Document 1] Jpn. Pat. Appln. Laid-Open Publication No. 2002-264776
[Patent Document 2] Jpn. Pat. Appln. Laid-Open Publication No. 2010-173338

SUMMARY OF THE INVENTION

However, in the wiper device, when the wiper blade passes through near a vertical direction center portion of a glass surface in a backward wiping stroke (from upper inversion position to lower inversion position), a load is abruptly reduced by a gravity component applied to the wiper blade. When the load is abruptly reduced, a blade speed during control exceeds a target speed. Thus, when a PI feedback control is performed at that time, a PWM Duty of a motor is reduced so as to reduce the speed. Then, the speed falls below the target speed, and the PWM Duty is increased so as to increase the speed. This repetition causes a disturbance in the PWM duty, a motor rotation number, and a pivot shaft rotating speed (blade speed) as indicated by dashed circles in FIG. 10, which may result in control instability (counter state). This may in turn cause so-called a stick-slip movement in which the wiper blade unexpectedly stops or suddenly starts to move in a boundary region between a dynamic friction state and a static friction state.

Also in a forward wiping stroke (from lower inversion position to upper inversion position), when the blade approaches the upper inversion position, the load is abruptly reduced, and this may result in control instability. For example, when a vehicle speed exceeds a certain value while the vehicle is traveling, a relationship between a gravity component applied to the blade and the like and an external force component caused by vehicle traveling wind may be reversed. When such a phenomenon occurs, the same phenomenon as that occurs in the backward wiping operation may occur also in the forward wiping operation, which may make movement of the wiper blade unstable.

A wiper control method according to an aspect of the present invention is a control method for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the method being characterized in that after a deceleration start position at which a speed of the wiper blade is made to start being reduced in a wiping operation of the wiper blade, the electric motor is driven using a PWM duty value (sld sta duty×Ksd) obtained by multiplying a PWM duty value (sld sta duty) at the deceleration start position by a predetermined deceleration coefficient Ksd set according to the position of the wiper blade on the surface to be wiped.

A wiper control method according to another aspect of the present invention is a control method for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the method being characterized in that after a deceleration start position at which a speed of the wiper blade is made to start being reduced in a wiping operation of the wiper blade, the electric motor is driven using a PWM duty value (ffc sta duty×Ksd) obtained by multiplying a PWM duty value (ffc sta duty) at a feedforward control start position set before the deceleration start position by a predetermined deceleration coefficient Ksd set according to the position of the wiper blade on the surface to be wiped.

In the above inventions, after the deceleration start position, the electric motor is driven by the PWM duty value obtained by multiplying the PWM duty value at the deceleration start position or PWM duty value at the feedforward control start position set before the deceleration start position by the predetermined deceleration coefficient Ksd, so that, after the deceleration start position, the blade speed is controlled by a predetermined value. Thus, even in a vehicle having a large load fluctuation, it is possible to suppress disturbance in the duty or motor rotation number due to an abrupt change in the load, thereby suppressing abnormal movement of the blade, such as stick-slip, which allows stabilization of the wiping movement.

In the wiper control method, the deceleration coefficient. Ksd may be set based on a ratio (tgt spd/pek tgt spd) between the target speed pek tgt spd at the deceleration start point and target speed tgt spd set according to the position of the wiper blade.

Further, wiper control may be performed such that the electric motor is feedback-controlled based on the speed of the wiper blade and is, after the deceleration start position, not subjected to the feedback control but driven using only the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the deceleration coefficient Ksd.

Further, wiper control may be performed such that after the deceleration start position, the electric motor is not subjected to the feedback control based on the speed of the wiper blade but is driven under coefficient control using the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the deceleration coefficient Ksd and is driven under the feedback control in place of the coefficient control when the speed of the wiper blade deviates from the target speed by a predetermined value or more.

Further, wiper control may be performed such that the electric motor is feedback-controlled based on the speed of the wiper blade and is, after the deceleration start position, driven by combination of the feedback control and control using the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the deceleration coefficient Ksd. In this case, after the deceleration start position, the electric motor may be driven by an output PWM duty value:

$$\text{output PWM duty} = (a \times D1 + b \times D2)/c$$

(where, $c = a+b$) or $$\text{output PWM duty} = (a \times D_{\!f\!f} + b \times D_{f\!b})/c$$

(where, $c = a+b$)

calculated using a value D1 obtained by multiplying the PWM duty value (sld sta duty) at the deceleration start position by the deceleration coefficient Ksd or value $D_{\!f\!f}$ obtained by multiplying the PWM duty value (ffc sta duty) at the feedforward control start position set before the deceleration start position by the deceleration coefficient Ksd and a PWM duty value D2 ($D_{f\!b}$) based on the feedback control.

A wiper control method according to still another aspect of the present invention is a control method for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the method being characterized in that the wiper device has, in one control cycle of the wiper blade, a deceleration region over which the electric motor is decelerated, and in the deceleration region, the electric motor is driven under a predetermined control mode set according to a load state in a region over which the wiper blade on the surface to be wiped is operating at a maximum speed. With this configuration, after the deceleration start position, blade speed control is performed according to the load state in the maximum speed region, allowing stabilization of the wiping movement of the blade.

A control device according to an aspect of the present invention is a control device for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the control device comprising: a blade position detection section that detects a current position of the wiper blade; a blade speed detection section that detects a current moving speed of the wiper blade; a blade speed determination section that compares a blade target speed tgt spd corresponding to the current position of the wiper blade and the current speed of the wiper blade; a motor rotation number calculation section that calculates a rotation number of the electric motor based on a result of the determination made by the blade speed determination section; and a drive control instruction section that controls operation of the electric motor based on an instruction from the motor rotation number calculation section, wherein after a deceleration start position at which a speed of the wiper blade is made to start being reduced in a wiping operation of the wiper blade, the motor rotation number calculation section uses, as a PWM duty value for the electric motor, a value (sld sta duty×Ksd) obtained by multiplying a PWM duty value (sld sta duty) at the deceleration start position by a predetermined deceleration coefficient Ksd set according to the position of the wiper blade on the surface to be wiped.

Further, a control device according to another aspect of the present invention is a control device for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the control device comprising: a blade position detection section that detects a current position of the wiper blade; a blade speed detection section that detects a current moving speed of the wiper blade; a blade speed determination section that compares a blade target speed tgt spd corresponding to the current position of the wiper blade and the current speed of the wiper blade; a motor rotation number calculation section that calculates a rotation number of the electric motor based on a result of the determination made by the blade speed determination section; and a drive control instruction section that controls operation of the electric motor based on an instruction from the motor rotation number calculation section, wherein after a deceleration start position at which a speed of the wiper blade is made to start being reduced in a wiping operation of the wiper blade, the motor rotation number calculation section uses a PWM duty value (ffc sta duty×Ksd) obtained by multiplying a PWM duty value (ffc sta duty) at a feedforward control start position set before the deceleration start position by a predetermined deceleration coefficient. Ksd set according to the position of the wiper blade on the surface to be wiped.

In the above inventions, there are provided the blade speed determination section that compares the blade target speed tgt spd corresponding to the current position of the wiper blade and the current speed of the wiper blade and motor rotation number calculation section that calculates a rotation number of the electric motor based on a result of the determination made by the blade speed determination section. After the deceleration start position, the motor rotation number calculation section uses, as the PWM duty value, the PWM duty value obtained by multiplying the PWM duty value (sld sta duty) at the deceleration start position or PWM value at the feedforward control start position set before the deceleration start position by the predetermined deceleration coefficient Ksd to drive the electric motor, so that, after the deceleration start position, the blade speed is controlled by a predetermined value. Thus, even in a vehicle having a large load fluctuation, it is possible to suppress disturbance in the duty or motor rotation number due to an abrupt change in the load, thereby suppressing abnormal movement of the blade, such as stick-slip, which allows stabilization of the wiping movement.

In the wiper control device, the deceleration coefficient Ksd may be set based on a ratio (tgt spd/pek tgt spd) between the target speed pek tgt spd at the deceleration start point and target speed tgt spd set according to the position of the wiper blade.

Further, wiper control may be performed such that the electric motor is feedback-controlled by the motor rotation number calculation section based on the speed of the wiper blade and is, after the deceleration start position, not subjected to the feedback control but driven using only the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the predetermined deceleration coefficient Ksd.

Further, wiper control may be performed such that after the deceleration start position, the electric motor is not subjected to the feedback control by the motor rotation number calculation section but is driven under coefficient control using the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the predetermined deceleration coefficient Ksd and is driven under the feedback control in place of the coefficient control when the speed of the wiper blade deviates from the target speed by a predetermined value or more.

Further, wiper control may be performed such that the electric motor is feedback-controlled by the motor rotation number calculation section based on the speed of the wiper blade and is, after the deceleration start position, driven by combination of the feedback control and control using the value obtained by multiplying the PWM duty value (sld sta duty) at the deceleration start position by the deceleration coefficient Ksd or value obtained by multiplying the PWM duty value (ffc sta duty) at the feedforward control start position set before the deceleration start position by the deceleration coefficient Ksd. In this case, after the deceleration start position, the electric motor may be driven by an output PWM duty value:

$$\text{output PWM duty} = (a \times D1 + b \times D2)/c$$

(where, $c=a+b$) or $$\text{output PWM duty} = (a \times D_{\!f\!f} + b \times D_{\!f\!b})/c$$

(where, $c=a+b$)

calculated using a value D1 obtained by multiplying the PWM duty value (sld sta duty) at the deceleration start position by the deceleration coefficient Ksd or value DH obtained by multiplying the PWM duty value (ffc sta duty) at the feedforward control start position set before the deceleration start position by the deceleration coefficient Ksd and a PWM duty value D2 ($D_{fb}$) based on the feedback control.

Further, a control device according to still another aspect of the present invention is a control device for a wiper device, the wiper device including a wiper blade disposed on a surface to be wiped and an electric motor for reciprocating the wiper blade on the surface to be wiped, the electric motor being subjected to PWM duty control based on a target speed of the wiper blade set according to a position of the wiper blade on the surface to be wiped, the control device being characterized in that the wiper device has, in one control cycle of the wiper blade, a deceleration region over which the electric motor is decelerated, and in the deceleration region, the control device drives the electric motor under a predetermined control mode set according to a load state in a region over which the wiper blade on the surface to be wiped is operating at a maximum speed. With this configuration, after the deceleration start position, blade speed control is performed according to the load state in the maximum speed region, allowing stabilization of the wiping movement of the blade.

According to the wiper control method of the present invention, after the deceleration start position of the wiper blade wiping operation, the electric motor is driven using the PWM duty value obtained by multiplying the PWM duty value at the deceleration start position or PWM duty value at the feedforward control start position set before the deceleration start position by the predetermined deceleration coefficient Ksd, so that, after the deceleration start position, the blade speed is controlled based on a predetermined value. Thus, it is possible to suppress disturbance in the duty or motor rotation number due to an abrupt change in the load, thereby suppressing abnormal movement of the blade, such as stick-slip, which may occur after the deceleration start position, which allows stabilization of the wiping movement.

According to the wiper device of the present invention, there are provided the blade speed determination section that compares the blade target speed corresponding to the current position of the wiper blade and the current speed of the wiper blade and motor rotation number calculation section that calculates a rotation number of the electric motor based on a result of the determination made by the blade speed determination section. After the deceleration start position of the wiper blade wiping operation, the motor rotation number calculation section uses the PWM duty value obtained by multiplying the PWM duty value at the deceleration start position or PWM value at the feedforward control start position set before the deceleration start position by the predetermined deceleration coefficient Ksd to drive the electric motor, so that, after the deceleration start position, the blade speed is controlled by a predetermined value. Thus, it is possible to suppress disturbance in the duty or motor rotation number due to an abrupt change in the load, thereby suppressing abnormal movement of the blade, such as stick-slip, which may occur after the deceleration start position, which allows stabilization of the wiping movement.

BRIEF DESCRIPTION OF THE DRAWINGS

FIGS. 6A and 6B are each an explanatory view explanatory view illustrating temporal changes in the PWM duty, blade speed, and motor rotation number when water is sprayed near the lower inversion position in the backward wiping stroke, in which FIG. 6A illustrates a case where the control according to a second embodiment is performed, and FIG. 6B illustrates a case where the control according to the first embodiment is performed.

DETAILED DESCRIPTION OF THE INVENTION

Figure 1:
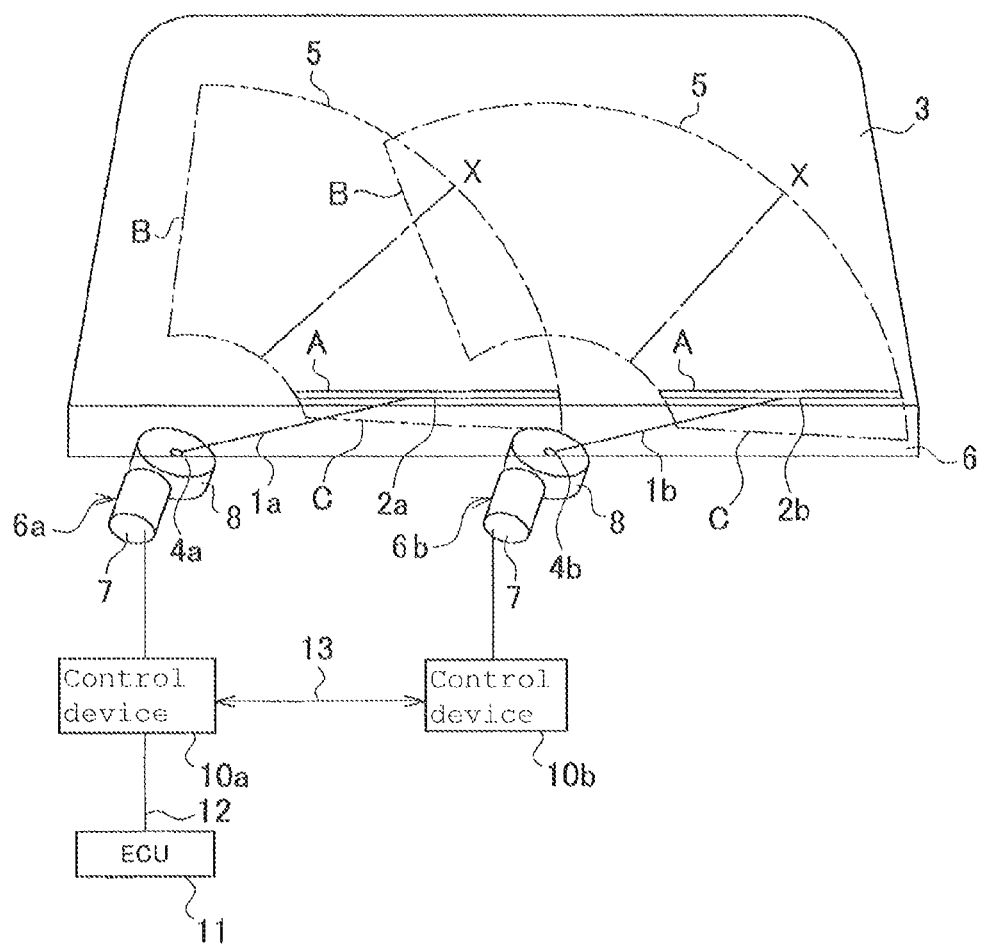
FIG. 1 is an explanatory view illustrating an entire configuration of a wiper system driven by a control method/control device according to a first embodiment of the present invention.

Now, embodiments of the present invention will be described in greater detail by referring to the drawings. An object of the following embodiments is to suppress disturbance of control due to fluctuation in a blade load and stabilize wiping movement of a wiper blade near an inversion position in a vehicle wiper device.

First Embodiment

FIG. 1 is an explanatory view illustrating an entire configuration of a wiper system driven by a control method/control device according to a first embodiment of the present invention. A wiper device of FIG. 1 includes a driver's seat side wiper arm 1a and a passenger's seat side wiper arm 1b. The wiper arms 1a and 1b are swingably attached to a vehicle body. A driver's seat side wiper blade 2a and a passenger's seat side wiper blade 2b are connected to the wiper arms 1a and 1b, respectively. The wiper blades 2a and 2b (hereinafter, abbreviated as "blades 2a and 2b") are brought into elastic contact with a windshield 3 by a not illustrated spring member provided inside the wiper arms 1a and 1b. Two wiper shafts (pivot shafts) 4a and 4b are fixed to the vehicle body. Base end portions of the wiper arms 1a and 1b are fixed to the wiper shafts 4a and 4b, respectively. The "a, b" of the reference numeral indicates that components or portions are provided on both the driver's seat side and passenger's seat side.

The wiper system has two electric motors 6a and 6b (hereinafter, abbreviated as "motors 6a and 6b") for swinging the wiper arms 1a and 1b. The motors 6a and 6b are each constituted by a motor body 7 and a deceleration mechanism 8. The motors 6a and 6b are subjected to PWM duty control by wiper control devices 10a and 10b, respectively, to be rotated in forward and backward directions. The wiper control device 10a controlling drive of the motor 6a is connected to an ECU 11 as a vehicle side control device through an on-vehicle LAN 12. Switch information such as ON/OFF, Lo, Hi, INT (intermittent operation) or the like of a wiper switch, engine start-up information, and the like are input from the ECU 11 to the wiper control device 10a through the LAN 12. The wiper control devices 10a and 10b are connected to each other through a communication line 13.

In the wiper system of FIG. 1, the motors 6a and 6b are feedback-controlled (PI-controlled) based on position information of the blades 2a and 2b, respectively. In this example, target speeds tgt spd of both the blades are set according to the positions of the respective blades 2a and 2b. The target speeds tgt spd are previously stored in the respective wiper control devices 10a and 10b in the form of a map or the like. The wiper control devices 10a and 10b detect current positions of the respective blades 2a and 2b and detects moving speeds of the respective blades 2a and 2b from rotating speeds of the respective wiper shafts 4a and 4b. The control devices 10a and 10b compares the current speeds of the blades 2a and 2b with the target speeds tgt spd of the blades 2a and 2b at positions where the current speeds are detected and appropriately controls each of the motors 6a and 6b according to a difference between the target speed tgt spd and current speed.

Figure 2:
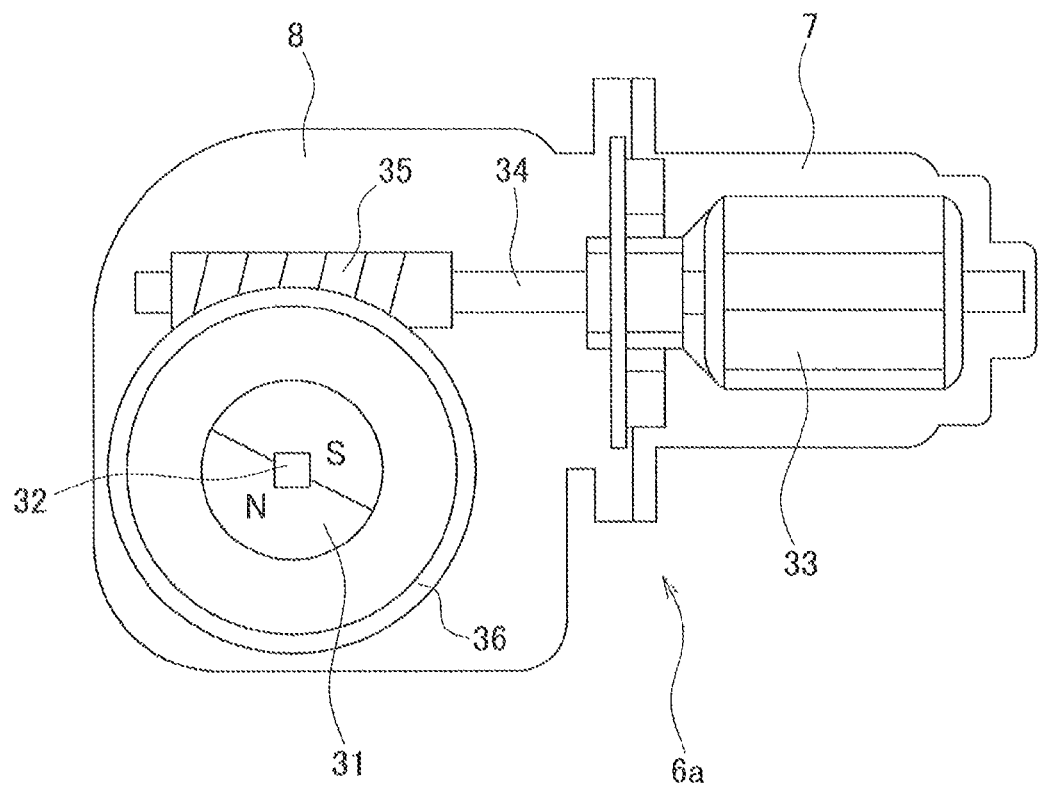
FIG. 2 is an explanatory view illustrating a configuration of an electric motor used in the wiper system of FIG. 1.

For feedback control, the motors 6a and 6b each have a sensor magnet 31 and a rotary encoder IC 32. FIG. 2 is an explanatory view illustrating a configuration of the motor 6a. The motor 6b has the same configuration as that of the motor 6a. As described above, the motor 6a is constituted by the motor body 7 and deceleration mechanism 8. A rotor 33 is rotatably disposed inside the motor body 7. A worm 35 is fixed to a rotary shaft 34 of the rotor 33. The worm 35 is engaged with a worm wheel 36 disposed in the deceleration mechanism 8. The worm wheel 36 is fixed to the wiper shaft 4a. The sensor magnet 31 is attached to the wiper shaft 4a or worm wheel 36. A not illustrated control board is provided on the deceleration mechanism 8 side of the motor 6a. The sensor magnet 31 is disposed so as to face the rotary encoder IC 32 mounted to the control board.

The rotary encoder IC 32 converts a change in an output voltage due to a change in magnetism of the sensor magnet 31 into an angle to thereby detect a rotation angle of the wiper shaft 4a. There is a predetermined relationship between an output voltage value of the rotary encoder IC 32 and the rotation angle of the wiper shaft 4a, and the current position of the blade 2a is detected based on the output voltage value. Further, the rotating speed of the wiper shaft 4a is calculated by detecting an angle change of the wiper shaft 4a per unit time, whereby the speed of the blade 2a is detected. A method for calculating the rotation angle and rotating speed of the wiper shaft 4a is not limited to a method using the above rotary encoder IC 32, but may be one based on pulse detection using a hall IC.

Control information such as the speed and current position of the blade 2a is exchanged between the wiper control devices 10a and 10b through the communication line 13. The wiper control devices 10a and 10b synchronously control the motors 6a and 6b based on the positional relationship between the blades. That is, the wiper control devices 10a and 10b control forward/backward rotation of the motors 6a and 6b, respectively, based on the positions of their corresponding blades and, at the same time, control the motors 6a and 6b based on the position information of the blades 2a and 2b to thereby control the wiper system so as not to cause interference between the blades or not to increase a difference in angle between the blades. As a result, the blades 2a and 2b are each brought into swing movement between a lower inversion position A and an upper inversion position B, i.e., within a wiping range 5 indicated by a long dashed short dashed line in FIG. 1, whereby rain or snow adhered to the windshield 3 is wiped away therefrom.

Figure 3:
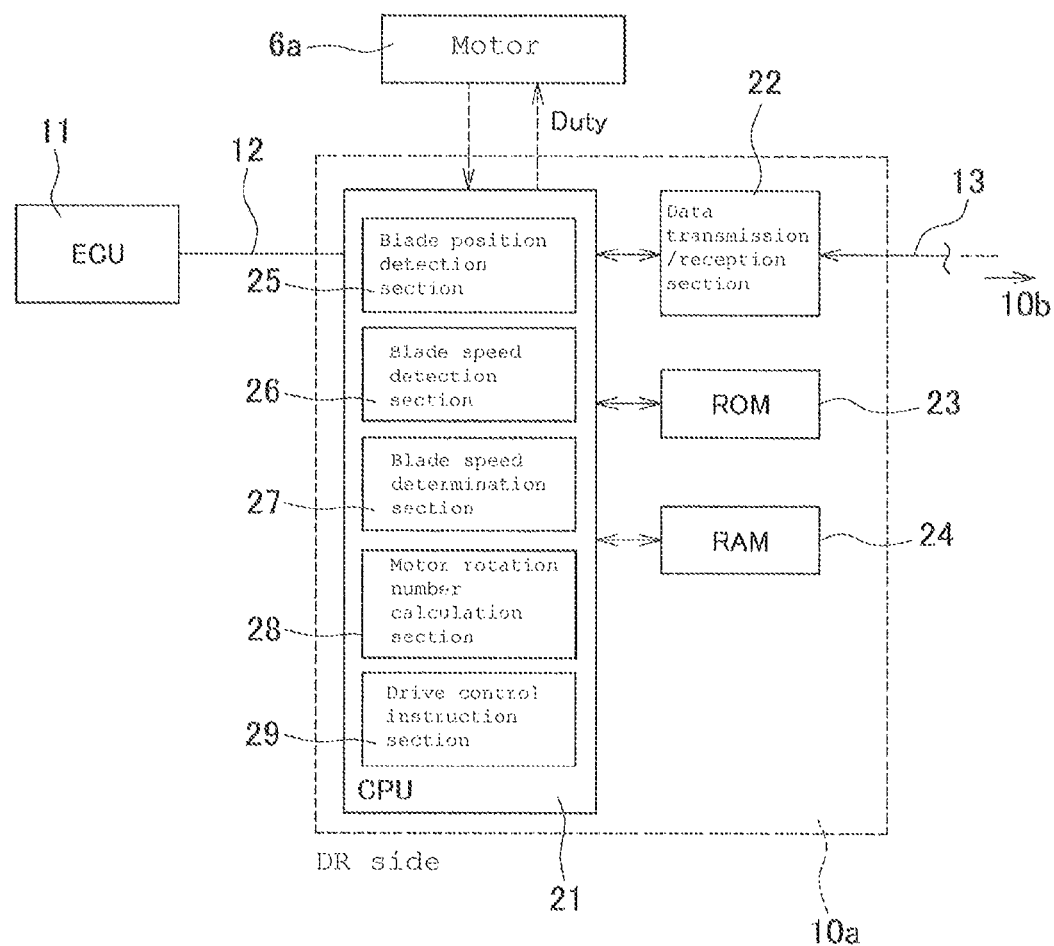
FIG. 3 is a block diagram illustrating a configuration of a control system of a wiper control device according to the present invention.
Figure 4:
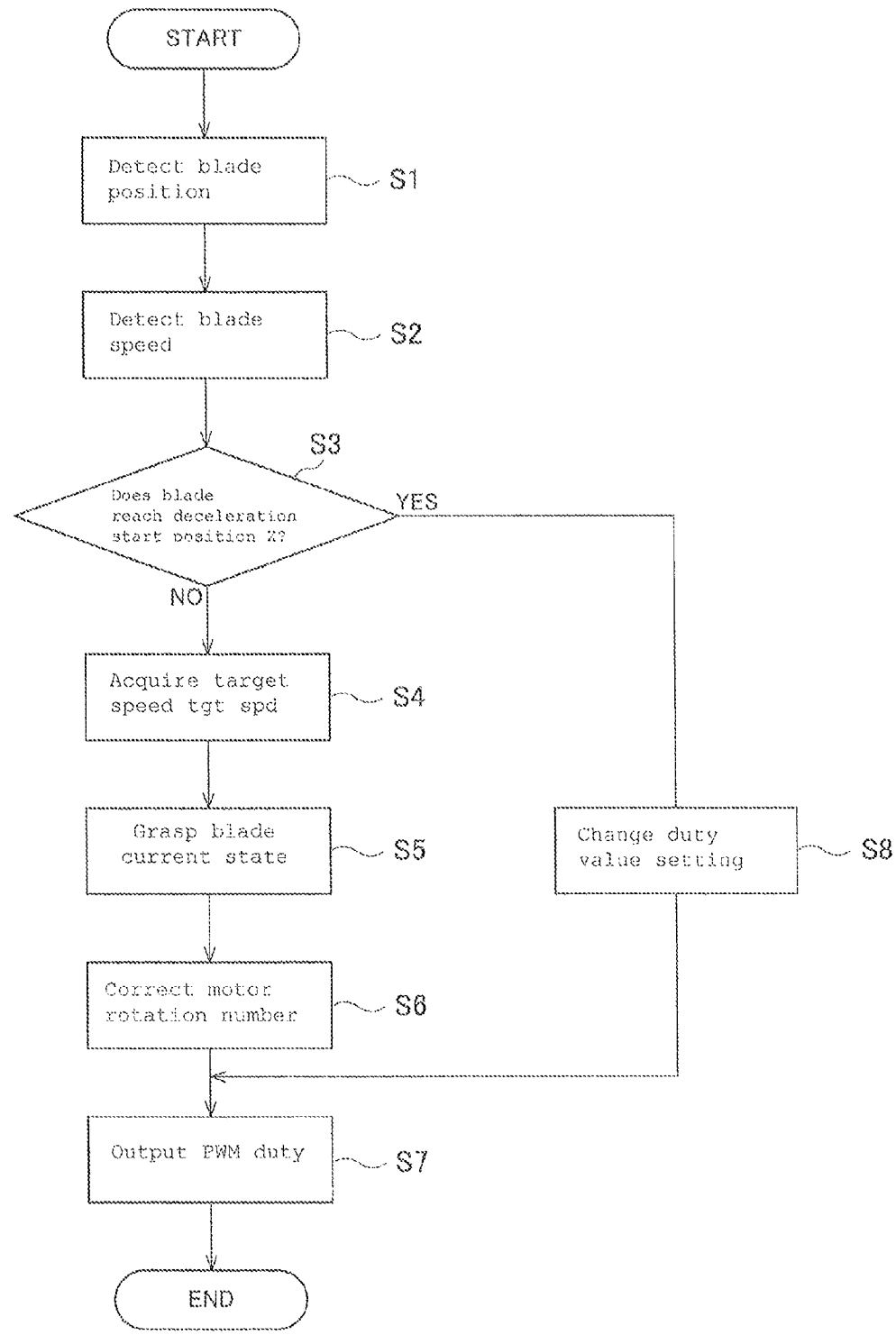
FIG. 4 is a flowchart illustrating a processing procedure of a wiper control method according to the present invention.

Also in the wiper system of FIG. 1, when the blades 2a and 2b each pass through a vertical direction center portion of the windshield 3 and reach a lower half region thereof in the backward wiping stroke, the load is abruptly reduced. This may cause a disturbance in the PWM duty or motor rotation number, as described above. Thus, in the wiper system according to the present embodiment, in order to prevent control from being unstable due to abrupt fluctuation in the load, a Duty calculation method is changed after a deceleration start position in the backward wiping stroke to thereby suppress output fluctuation of the motors 6a and 6b due to disturbance. FIG. 3 is a block diagram illustrating a configuration of a control system of the wiper control device 10 according to the present invention. FIG. 4 is a flowchart illustrating a processing procedure of the wiper control method according to the present invention. Processing of FIG. 4 are executed by the wiper control devices 10*a* and 10*b*. The wiper control devices 10*a* and 10*b* have the same configuration, so only a configuration of the wiper control device 10*a* will be described in FIG. 3 and in the following description.

As illustrated in FIG. 3, a CPU 21 and a data transmission/reception section 22 are provided in the wiper control device 10*a*. The wiper control device 10*a* is connected to the ECU 11 through the LAN 12. The wiper control device 10*a* receives, from the ECU 11, input of various vehicle information such as a wiper switch setting state (operation mode setting such as ON/OFF, Lo, Hi, or INT) or an engine start-up signal). Further, a ROM 23 and a RAM 24 are provided in the wiper control device 10*a*. The ROM 23 stores a control program and various control information. The RAM 24 stores data necessary for control, such as a motor rotation number and blade current position.

The CPU 21 is a central processing unit. In the present embodiment, the CPU connected to the ECU 11 serves as a master and a not illustrated CPU of the wiper control device 10*b* serves as a slave. The CPU 21 of the wiper control device 10*a* is connected to the CPU of the wiper control device 10*b* through the data transmission/reception section 22 and communication line 13. Both the CPUs exchange positional information or an operation instruction through the communication line 13. The master-side CPU 21 controls operation of the motor 6*a* based on the position information of the blade 2*b* received from the wiper control device 10*b* and position information of the blade 2*a* detected by itself according to a state of the wiper switch. The slave-side CPU controls operation of the motor 6*b* based on the position information of the blade 2*a* received from the wiper control device 10*a* and position information of the blade 2*b* detected by itself according to an instruction from the wiper control device 10*a*.

The CPU 21 further includes a position detection section 25, a blade speed detection section 26, a blade speed determination section 27, a motor rotation number calculation section 28, and a drive control instruction section 29. The position detection section 25 detects a current position of the blade 2*a* based on a sensor signal from the rotary encoder IC 32. The blade speed detection section 26 detects a current moving speed of the blade 2*a*. The blade speed determination section 27 reads a blade target speed tgt spd from the ROM 23 corresponding to the current position of the blade 2*a* and compares the blade target speed tgt spd and current speed of the blade 2*a*.

The motor rotation number calculation section 28 calculates a rotation number of the motor 6*a* based on a result of the determination made by the blade speed determination section 27, a positional relationship with the other blade, wiper switch information, and the like. The drive control instruction section 29 gives a rotation direction, Duty, and the like to the motor 6*a* based on an instruction from the motor rotation number calculation section 28 and appropriately moves the blade 2*a* between the upper and lower inversion positions. The motor rotation number calculation section 28 determines the rotation number of the motor 6*a* considering the above-mentioned conditions. However, in the wiper system according to the present invention, the Duty calculation method in the backward wiping stroke is changed at a deceleration start point to thereby suppress a rough change (irregular fluctuation) of the motor rotation number. The deceleration start point is not necessarily a center of the backward wiping stroke. In the present embodiment, the deceleration start point (position) refers to a time point (position) at which the motor starts deceleration after the blade 2*a* passes a region (maximum speed region) over which it is operating at the maximum speed after completion of acceleration.

In the wiper system according to the present invention, the following processing is performed for the wiping operation. As illustrated in FIG. 4, the current position of the blade 2*a* is detected in step S1, and the current speed of the blade 2*a* is detected in step S2. The order of steps S1 and S2 may be reversed. After the current position and current speed of the blade 2*a* are grasped in steps S1 and S2, the processing flow proceeds to step S3. In step S3, it is determined whether or not the blade 2*a* reaches a deceleration start position X in the backward wiping stroke. As described above, the deceleration start position X is not located at the center of the backward wiping stroke. When the blade 2*a* does not reach the deceleration start position X, the processing flow proceeds to step S4, where a target speed tgt spd corresponding to the current position of the blade 2*a* is acquired. The target speed tgt spd is stored in the ROM 23 as described above and is previously set with the position of the blade 2*a* as a parameter. By the processing of step S4, a target value of the blade speed corresponding to the current position of the blade 2*a* is set.

After acquisition of the target speed tgt spd, the processing flow proceeds to step S5. In step S5, the motor rotation number calculation section 28 determines current states (behind the set target?, ahead of the set target?, relationship between the blades is normal?, or the like) of the blade from the positions of both blades. After that, the processing flow proceeds to step S6, where an optimum PWM duty value (control duty value) for the blade 2*a* is set. The control duty value is set based on the current states of the blades and current speed and target speed tgt spd of the blade 2*a*. Setting processing of this control duty value is also executed by the motor rotation number calculation section 28. After setting of the duty value, the processing flow proceeds to step S7, where the drive control instruction section 29 outputs the PWM duty value based on the above setting value. As a result, the motor 6*a* is feedback-controlled based on the positions, speeds, and the like of the both blades, and this routine is ended.

On the other hand, when the blade 2*a* reaches the deceleration start position X in step S3, the processing flow proceeds to step S8, where the duty setting is changed. In this system, the motor rotation number calculation section 28 sets the PWM duty based on the following expression (expression (1)).

$$\text{Output PWM duty } (D1) = \text{PWM duty (sld sta duty) at deceleration start point} \times Ksd \quad \text{(expression 1)}$$

($Ksd$ = current target speed tgt spd/target speed pek tgt spd at deceleration start point)

Ksd is a control coefficient indicating a decrement in an output from the deceleration start point and is set according to the position of the blade 2*a*. In this system, the control coefficient Ksd is a ratio between the target speeds, i.e., a ratio between the target speed pek tgt spd at the deceleration start position X and target speed tgt spd of the blade 2*a* set according to the position of the wiper blade 2*a*. The control coefficient Ksd is stored in the ROM 23 as a map corresponding to the blade position. The motor rotation number calculation section 28 uses this map to set the output PWM duty based on the blade position.

After setting of the output PWM duty in step S8, the processing flow proceeds to step S7. In step S7, the drive control instruction section 29 outputs the PWM duty value set based on the expression (1). As a result, the motor 6a is driven based on a predetermined value (value calculated by expression (1)) described in the map after the deceleration start position X without feedback control.

Figure 5:
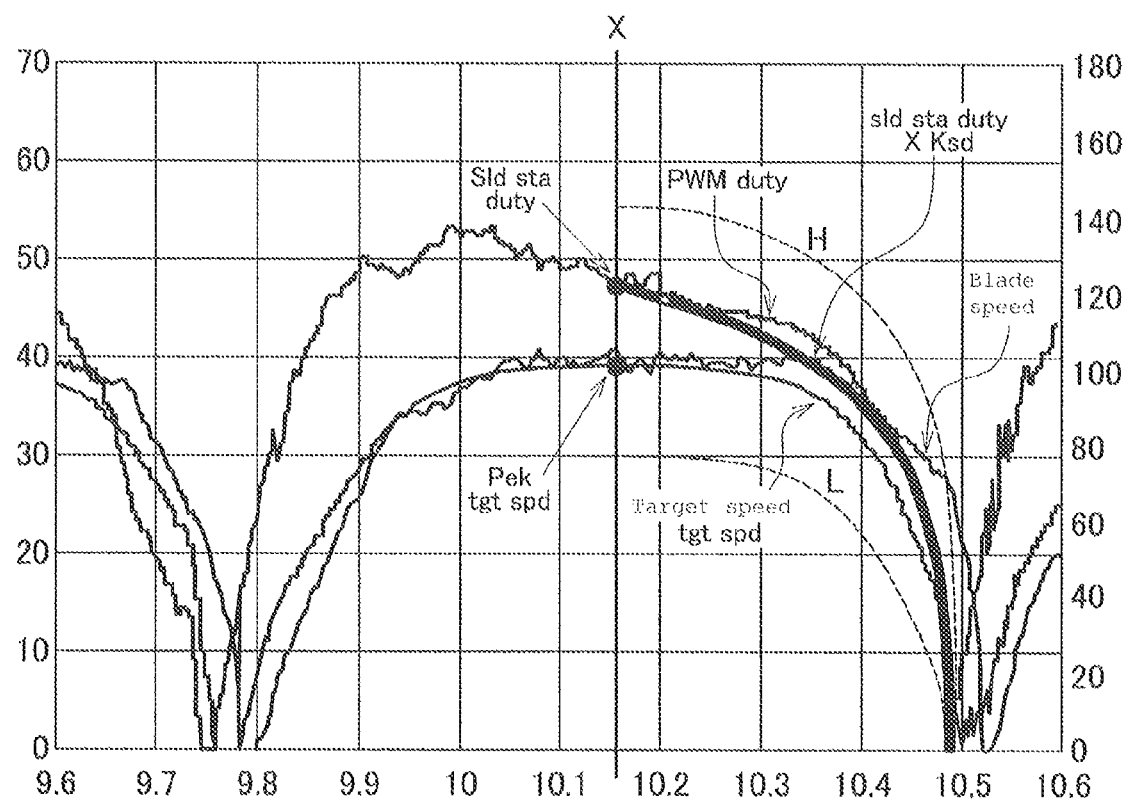
FIG. 5 is an explanatory view illustrating temporal changes in a PWM duty, a blade speed, and a motor rotation number in the wiper system according to the present invention.

FIG. 5 is an explanatory view illustrating temporal changes in the PWM duty, blade speed, and motor rotation number in the wiper system. As described above, the duty after the deceleration start is set to a value obtained by multiplying the duty (sld sta duty: slow down start duty) at the deceleration start point by the ratio of the current target speed tgt spd (target speed) to the target speed pek tgt spd (peak target speed) at the deceleration start point (expression (1)). Consequently, as illustrated in FIG. 5, in the system according to the present invention, the output duty is reduced in a predetermined parabolic curve after the deceleration start position, and the curve itself goes up and down (duty value increases or decreases) according to the duty value (a load state in a maximum speed region) at the deceleration start point. That is, when the load is high in the maximum speed region, the duty is reduced as represented by a curve H in FIG. 5; when the load is low, the duty is reduced as represented by a curve L. Thus, in the deceleration region, the motor 6a is driven by a predetermined control mode set according to the load state in the maximum speed region.

Figure 10:
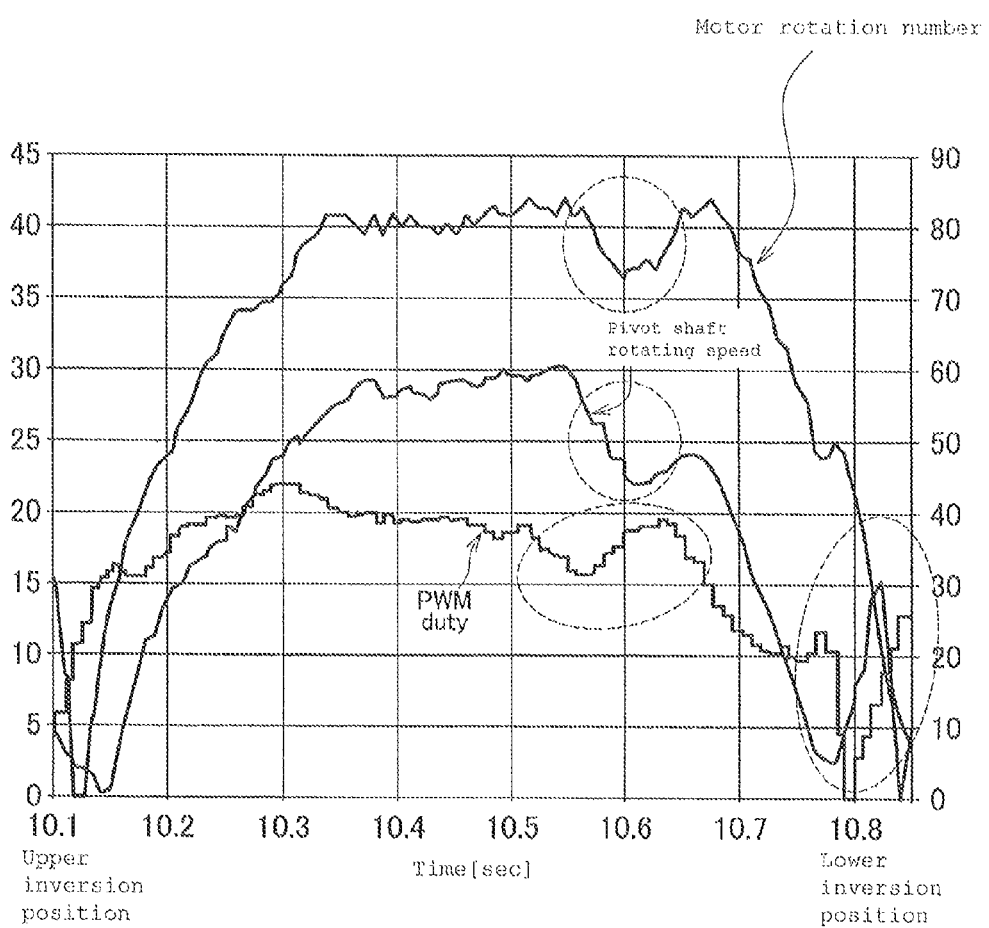
FIG. 10 is an explanatory view illustrating temporal changes in the PWM duty, blade speed, and motor rotation number in a conventional control system.

In the wiper system according to the present invention, after the deceleration start position in the backward wiping stroke, the PWM duty value for motor drive is set based on the expression (1). Consequently, as illustrated in FIG. 5, after the deceleration start position, the blade speed and motor rotation number change in a parabolic fashion without disturbance while following the target value, with the result that they reach the lower inversion position in a smooth deceleration curve. Thus, the disturbance in the duty or motor rotation number due to an abrupt change in the load, which is as illustrated in FIG. 10, can be suppressed, thereby suppressing abnormal movement of the blade, such as stick-slip, which allows stabilization of the wiping movement.

Second Embodiment

The following describes, as a second embodiment of the present invention, a control mode in which a PI feedback control is performed in parallel also after the deceleration start position X. As described above, in the control mode according to the first embodiment, adverse affect due to the abrupt reduction in the load can be properly avoided. However, when a state of the glass surface is abruptly changed from DRY to WET after the deceleration start position, the blade speed may become excessive (overshoot). Thus, in the control mode of the second embodiment, a PI feedback control is performed in parallel to the control based on the expression (1) so as to improve correspondence to the load fluctuation.

In the control according to the second embodiment, the processing of step S8 is changed as follows. That is, a duty value D1 is calculated based on the above expression (1), and a control duty value D2 in the feedback control performed in steps S4 to S6 is calculated. Then, based on these values D1, D2 and the following expression (2), the PWM duty value is set/output.

Output PWM duty=$(a \times D1 + b \times D2)/c$   expression (2)

(where, $c=a+b$)

That is, in determining the PWM duty value, both the specified value D1 and feedback calculation value D2 are used, and weighting of the values D1 and D2 is appropriately adjusted, so as to properly cope with the abrupt reduction in the load and state change of the glass surface.

Figure 6:
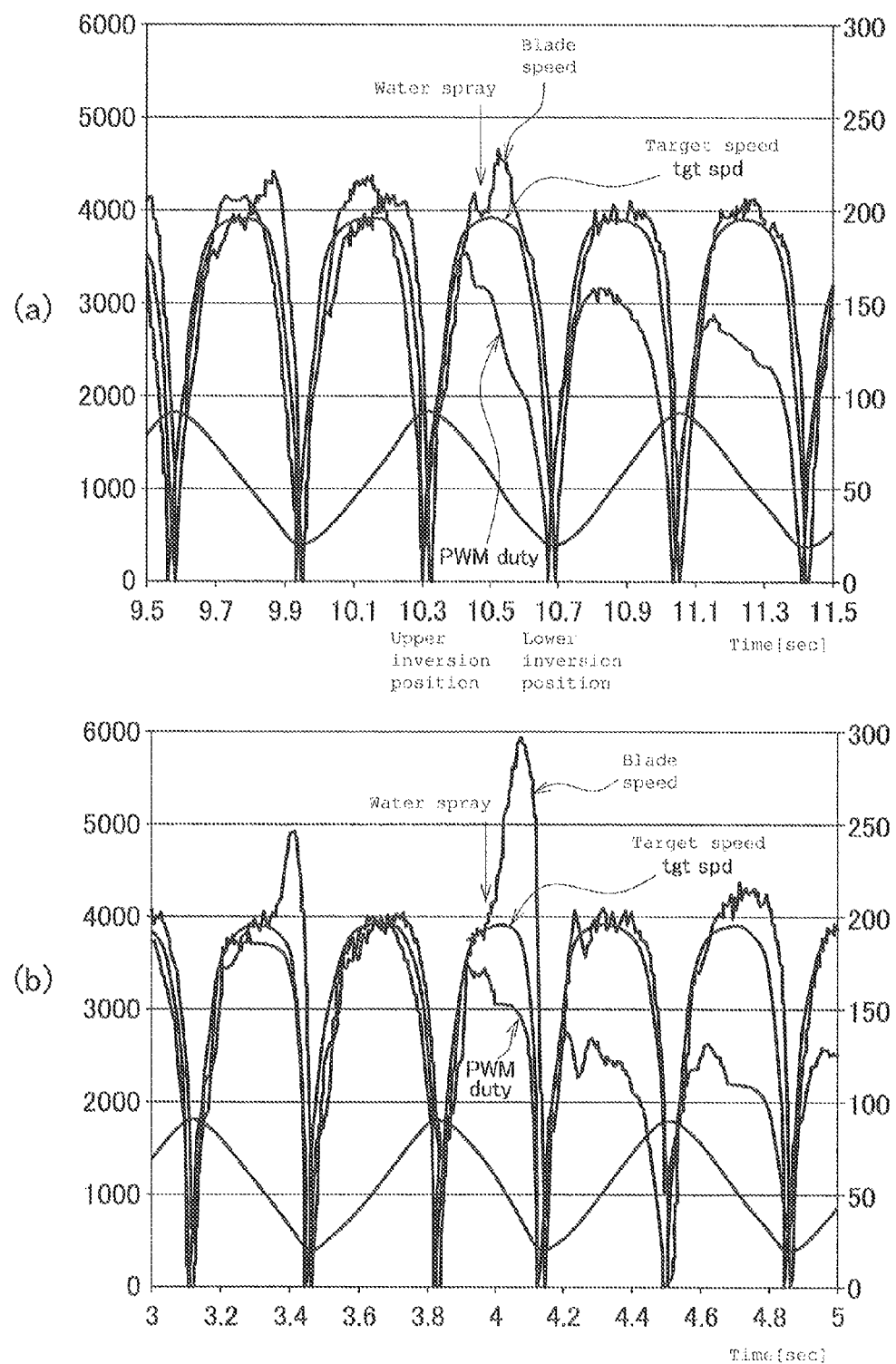

FIGS. 6A and 6B are each an explanatory view illustrating temporal changes in the PWM duty, blade speed, and motor rotation number when water is sprayed near the lower inversion position in the backward wiping stroke. FIG. 6A illustrates a case where the control according to the second embodiment is performed, and FIG. 6B illustrates a case where the control according to the first embodiment is performed. In the control mode of FIG. 6A, D1 and D2 are equivalently handled (a=1, b=1) in the expression (2), and D1 and D2 are added and then divided by two (c=2) (50% deceleration guidance). As illustrated in FIG. 6B, in the control mode according to the first embodiment, when the glass surface is abruptly turned in a WET state after the deceleration start position in the backward wiping stroke, it is impossible to cope with the WET state since the feedback control is not performed, with the result that the blade speed abruptly increases ("water-sprayed portion" in a center of FIG. 6B).

On the other hand, in the control mode according to the second embodiment, although the blade speed increases due to the WET state, a situation in which the blade speed increases is properly grasped by the PI feedback control and reflected in the control. As a result, as shown in FIG. 6A, the speed increase is suppressed to allow disturbance in the speed can be reduced to a low level ("water-sprayed portion" in a center of FIG. 6A). As described above, in the control mode according to the second embodiment, control by the specified value D1 and PI feedback control are performed in parallel, whereby it is possible to reduce disturbance in the Duty or motor rotation number due to the load change while coping with the abrupt change in the glass surface state. Thus, adaptability to the disturbance is improved to allow the wiping movement to be further stabilized.

Third Embodiment

Figure 7:
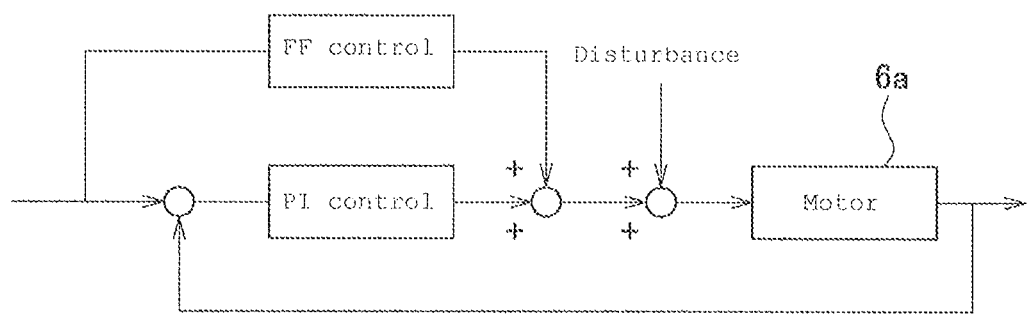
FIG. 7 is an explanatory view illustrating control processing to be performed in a control mode according to a third embodiment.
Figure 8:
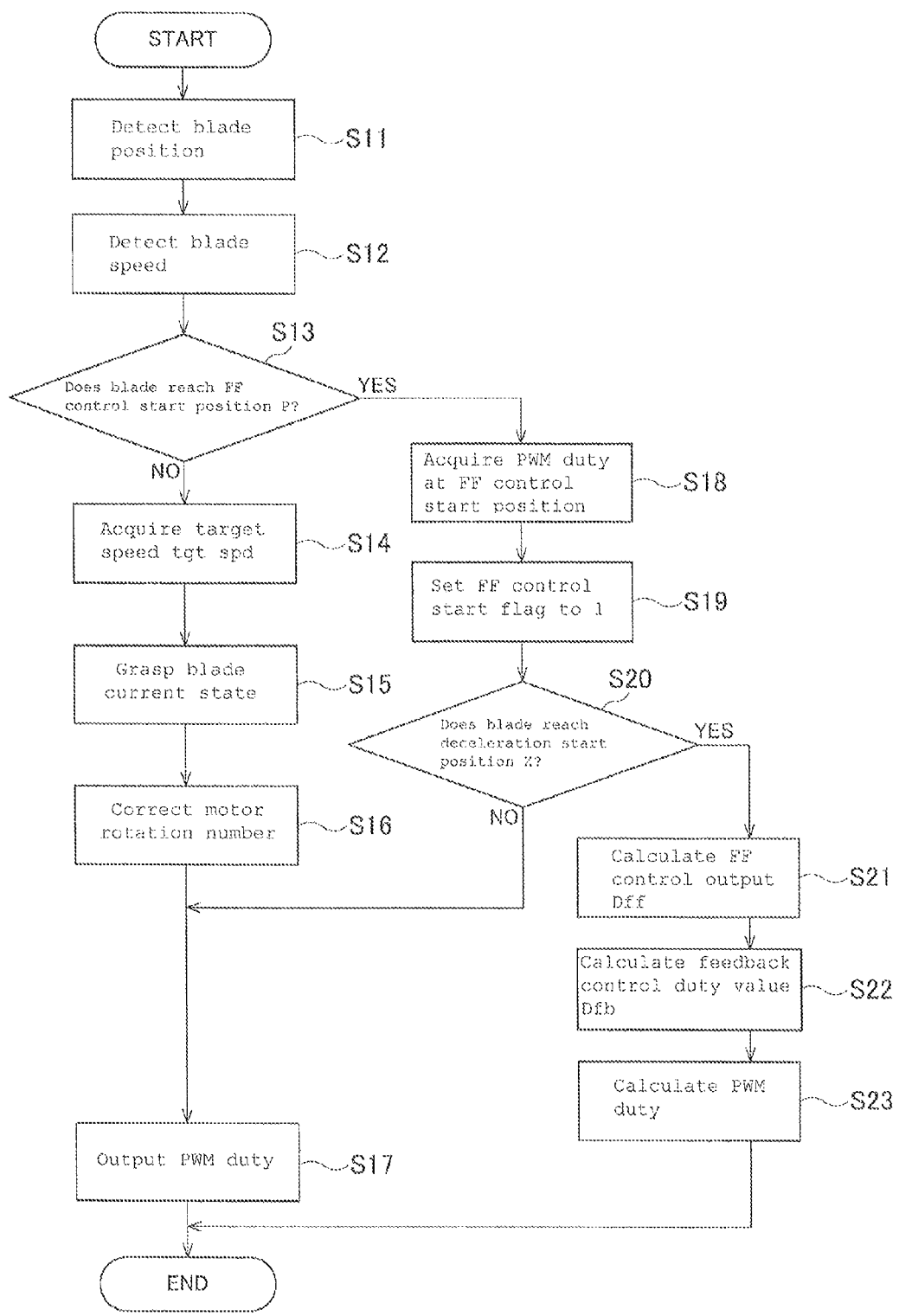
FIG. 8 is a flowchart illustrating a processing procedure of the wiper control method according to the third embodiment.

The following describes, as a third embodiment of the present invention, a control mode in which a feedforward control (hereinafter abbreviated as "FF control") start position P is set at a position (e.g., a position shifted by 10° from the deceleration start position X) short of the deceleration start position X, and the duty value D1 is calculated based on a PWM duty (ffc sta duty) at a FF control start point. FIG. 7 is an explanatory view illustrating control processing to be performed in the control mode according to the third embodiment, and FIG. 8 is a flowchart illustrating a processing procedure of the control processing. The FF control start position P is set within the above-mentioned maximum speed region.

As illustrated in FIG. 7, in the wiper system of the third embodiment, the PI feedback control and FF control assuming disturbance are executed according to a processing procedure as illustrated in FIG. 8. Also in this case, as illustrated in FIG. 8, the current position and current speed of the blade 2a are detected in steps S11 and S12, respectively. Then, after the current position and current speed are grasped, the processing flow proceeds to step S13, where it is determined whether or not the blade 2a reaches the FF control start position P. When the blade 2a does not reach the FF control start position P in step S13, the processing flow proceeds to steps S14 to S17. In steps S14 to S17, the PWM duty value is output based on the current states of the blades, and current speed and target speed tgt spd of the blade 2a, as in steps S4 to S7 of FIG. 4.

On the other hand, when the blade 2a reaches the FF control start position P in step S13, the processing flow proceeds to step S18. In step S18, for the FF control, the current PWM duty (ffc sta duty) is acquired. After acquisition of the PWM duty (ffc sta duty), an FF control start flag is set (FF control start flag=1) in step S19, and then the processing flow proceeds to step S20. In step S20, it is determined whether or not the blade 2a reaches the deceleration start position X in the backward wiping stroke. When the blade 2a does not reach the deceleration start position X in step S20, the processing flow proceeds to steps S14 to S17, where the feedback control is continued. On the other hand, when the blade 2a reaches the deceleration start position X in step S20, the processing flow proceeds to step S21, where an FF control output $D_{ff}$ is calculated.

Here, the motor rotation number calculation section 28 sets the PWM duty based on the following expression (expression (3)).

FF control output $D_{ff}$=PWM duty (ffc sta duty) at FF control start position×$Ksd$ \hfill expression (3)

($Ksd$=current target speed tgt spd/target speed pek tgt spd at deceleration start point)

Figure 9:
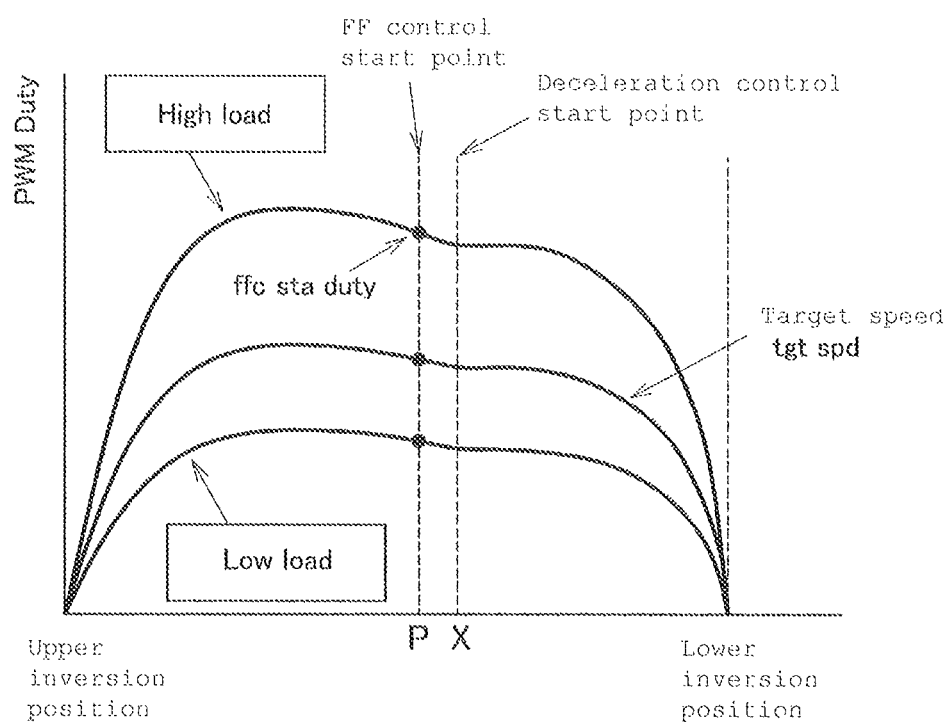
FIG. 9 is an explanatory view illustrating concepts of a FF control start position P, and a current target speed tgt spd and a target speed pek tgt spd at the deceleration start point in the present invention.

As described above, Ksd is a control coefficient indicating a decrement in an output from the deceleration start point. FIG. 9 is an explanatory view illustrating concepts of the FF control start position P, and current target speed tgt spd and target speed pek tgt spd at the deceleration start point in the present invention. As illustrated in FIG. 9, the target speed pek tgt spd at the deceleration start point is reduced in a predetermined parabolic curve after the deceleration start position, and the curve itself goes up and down (duty value increases or decreases) according to the duty value at the deceleration start point.

After calculation of the FF control output $D_{ff}$ in step S21, the processing flow proceeds to step S22. In step S22, according to the same procedure as that of the steps S14 to S17, the control duty value $D_{fb}$ in the feedback control (Dfb=above-mentioned D2) is calculated. Then, in step S23, based on the above values ($D_{ff}$, $D_{fb}$) and the following expression (4), the PWM duty value is set/output.

Output PWM duty=$(a \times D_{ff}+b \times D_{fb})/c$ \hfill expression (4)

(where, $c=a+b$)

As described above, in the control processing in the third embodiment, both the FF control value $D_{ff}$ (specified value) assuming disturbance and feedback calculation value $D_{fb}$ are used for determination of the PWM duty value, and weighting of the values $D_{ff}$ and $D_{fb}$ is appropriately adjusted. Consequently, as above, it is possible to reduce disturbance in the Duty or motor rotation number due to the load change while coping with the abrupt change in the glass surface state. Thus, adaptability to the disturbance is improved to allow the wiping movement to be further stabilized. In the third embodiment, as in the first embodiment, it is possible to perform the above control by using only the FF control output $D_{ff}$ without performing the feedback operation (control duty value $D_{fb}$ is not used: b=0).

The present invention is not limited to the above embodiments, but may be variously modified without departing from the spirit of the present invention.

For example, in the above first embodiment, the PI feedback control is not performed after the deceleration start position X; however, the event described in the second embodiment can be assumed, so that the PI feedback control may be continuously calculated after the deceleration start position X and, when the current blade speed deviates from the target speed by a predetermined value or more (e.g., 20% or more), the control mode may be switched from the control according to the specified value D1 to PI feedback control.

Further, the values a and b in the second and third embodiments are just illustrative, and may be appropriately changed according to a vehicle type or disturbance to be assumed. For example, it is possible to place importance on the control according to the specified value D1 by setting the values of a and b to 2 and 1, respectively; conversely, it is possible to place importance on the control according to the feedback calculation value D2 by setting the values of and b to 1 and 2, respectively. Further, the weighting of the D1 and D2 may be changed as needed depending on the disturbance state, or the D1 and D2 may be changed as needed by learning.

Further, in the above respective embodiments, the ratio between the current target speed tgt spd and target speed pek tgt spd at the deceleration start point is used as the deceleration coefficient Ksd. Alternatively, however, in a wiper device that performs motor control by previously setting a target duty value corresponding to the blade position, a ratio (current target duty value/target duty value at deceleration start point) between the target duty value at the current position and target duty value at the deceleration start position may be used as the Ksd.

In addition, although a control example in the backward wiping stroke has been described in the above respective embodiments, the control mode according to the present invention can be applied to the forward wiping stroke. As described above, also in the forward wiping stroke, the same phenomenon as that in the backward wiping stroke may occur. Thus, in order to prevent the unstable phenomenon in the forward wiping stroke, the duty calculation method may be changed from the deceleration start point of the wiper system also in the forward wiping stroke, as in the backward wiping stroke. That is, the present invention can be carried out in the motor deceleration regions set in the respective forward and backward wiping strokes constituting one control cycle. Thus, according to the present invention, after the deceleration start position, the motor speed control can be performed under a predetermined control mode set according to the duty value at the deceleration start position or FF control start position, that is, the load in the maximum, speed range. The one control cycle in the present invention is a control cycle related to one reciprocating operation of the wiper blade.

Further, in the above respective embodiments, the two motors are used to drive the respective wiper arms in the wiper system as illustrated in FIG. 1; however, the wiper system to which the present invention can be applied is not limited to this. For example, the present invention can be applied to a wiper system that uses a link mechanism to move two wiper arms with one electric motor.

Further, although the electric motor illustrated in FIG. 2 has one sensor magnet 31 and one rotary encoder IC 32, a configuration of the electric motor is not limited to this. For example, it is possible to use a motor having a sensor magnet mounted to the rotary shaft and having a hall IC disposed so as to face the sensor magnet for the purpose of sensing a pole change in the sensor magnet. This motor is a pulse specification for detecting a pulse and outputs a pulse from the hall IC with rotation of the motor. The number of the hall ICs provided in the motor is not limited.

REFERENCE SIGNS LIST 1a, 1b: Wiper arm
2a, 2b: Wiper blade
3: Windshield
4a: Wiper shaft 5: Wiping range
6a, 6b: Electric motor
7: Motor body
8: Deceleration mechanism
10: Wiper control device
11: ECU
12: On-vehicle LAN
13: Communication line
21: CPU
22: Data transmission/reception section
23: ROM
24: RAM
25: Position detection section
26: Blade speed detection section
27: Blade speed determination section
28: Motor rotation number calculation section
29: Drive control instruction section
31: Sensor magnet
32: Rotary encoder IC
33: Rotor
34: Rotary shaft
35: Worm
36: Worm wheel
A: Lower inversion position
B: Upper inversion position
X: Deceleration start position
Ksd: Deceleration coefficient
tgt spd: Current, blade target speed
pek tgt spd: Blade target speed at deceleration start point
ffc sta duty: PWM duty at FF control start position
$D_{ff}$: FF control output (duty value)
$D_{fb}$: Control duty value in feedback control

The invention claimed is:

1. A wiper control method for a wiper device, the wiper device including a wiper blade disposed on a surface and an electric motor for reciprocating the wiper blade on the surface, the electric motor being subjected to pulse width modulation (PWM) duty control based on a target speed of the wiper blade set according to a position of the wiper blade on the surface, the wiper control method comprising:
   after a deceleration start position is reached at which a speed of the wiper blade is made to start being reduced in a wiping operation of the wiper blade, driving the electric motor using an output PWM duty value, the output PWM duty value being obtained by multiplying a PWM duty value at the deceleration start position by a deceleration coefficient, wherein the output PWM duty value fluctuates according to a load state in a region over which the wiper blade on the surface is operating at a maximum speed, and
   wherein the deceleration coefficient used is based on the position of the wiper blade on the surface and is a ratio between a target speed at the deceleration start point and a target speed according to the position of the wiper blade.

2. The wiper control method according to claim 1, further comprising
   feedback-controlling the electric motor based on the speed of the wiper blade; and
   after the deceleration start position, controlling the electric motor using only the value obtained by multiplying the PWM duty value at the deceleration start position by the deceleration coefficient.

3. The wiper control method according to claim 1, further comprising
   after the deceleration start position, controlling the electric motor under coefficient control using the value obtained by multiplying the PWM duty value at the deceleration start position by the deceleration coefficient; and
   feedback-controlling the electric motor in place of the coefficient control when the speed of the wiper blade deviates from the target speed by a predetermined value or more.

4. The wiper control method according to claim 1, further comprising
   feedback-controlling the electric motor based on the speed of the wiper blade; and
   after the deceleration start position, controlling the electric motor by a combination of the feedback control and control using the value obtained by multiplying the PWM duty value at the deceleration start position by the deceleration coefficient.

5. The wiper control method according to claim 4, wherein after the deceleration start position, the electric motor is driven by the PWM duty value calculated as follows:

$$\text{output PWM duty} = (a \times D1 + b \times D2)/c$$

(where, $c = a + b$)

calculated using a PWM duty value D1 obtained by multiplying the PWM duty value at the deceleration start position by the deceleration coefficient and a PWM duty value D2 based on the feedback control.

6. The wiper control method according to claim 1, wherein the deceleration coefficient is set based on a ratio between the target speed at the deceleration start point and target speed set according to the position of the wiper blade.

7. A control device for a wiper device, the wiper device including a wiper blade disposed on a surface and an electric motor for reciprocating the wiper blade on the surface, the wiper device having, in one control cycle of the wiper blade, a deceleration region over which the electric motor is decelerated, the electric motor being subjected to pulse width modulation (PWM) duty control based on a target speed of the wiper blade set according to a position of the wiper blade on the surface, the control device comprising:
   a non-transitory medium storing a program; and
   a hardware processor that executes the program, the execution of the program causing the control device to operate as:
   a blade position detection section that detects a current position of the wiper blade;
   a blade speed detection section that detects a current moving speed of the wiper blade;
   a blade speed determination section that compares a blade target speed corresponding to the current position of the wiper blade and the current speed of the wiper blade;
   a motor rotation number calculation section that calculates a rotation number of the electric motor based on a result of the determination made by the blade speed determination section; and
   a drive control instruction section that controls operation of the electric motor based on an instruction from the motor rotation number calculation section,
   wherein after a deceleration start position is reached at which a speed of the wiper blade is made to start being reduced in a wiping operation of the wiper blade, the motor rotation number calculation section uses an output PWM duty value for driving the electric motor, the output PWM duty value being obtained by multiplying a PWM duty value at the deceleration start position by a deceleration coefficient, wherein the output PWM duty value fluctuates according to a load state in a region over which the wiper blade on the surface is operating at a maximum speed, and the deceleration coefficient used is based on the position of the wiper blade on the surface and is a ratio between a target speed at the deceleration start point and a target speed according to the position of the wiper blade.

8. The wiper control device according to claim 7, wherein the electric motor is feedback-controlled by the motor rotation number calculation section based on the speed of the wiper blade and is, after the deceleration start position, driven using only the value obtained by multiplying the PWM duty value at the deceleration start position by the deceleration coefficient.

9. The wiper control device according to claim 7, wherein after the deceleration start position, the electric motor is driven under coefficient control using the value obtained by multiplying the PWM duty value at the deceleration start position by the deceleration coefficient and is driven under the feedback control in place of the coefficient control when the speed of the wiper blade deviates from the target speed by a predetermined value or more.

10. The wiper control device according to claim 7, wherein the electric motor is feedback-controlled by the motor rotation number calculation section based on the speed of the wiper blade and is, after the deceleration start position, driven by combination of the feedback control and control using the value obtained by multiplying the PWM duty value at the deceleration start position by the deceleration coefficient.

11. The wiper control device according to claim 7, wherein after the deceleration start position, the electric motor is driven by the motor rotation number calculation section using the PWM duty value calculated as follows:

output PWM duty=$(a \times D1 + b \times D2)/c$ (where, $c = a+b$)

calculated using a PWM duty value D1 obtained by multiplying the PWM duty value at the deceleration start position by the deceleration coefficient and a PWM duty value D2 based on the feedback control.

12. The wiper control device according to claim 7, wherein the deceleration coefficient is set based on a ratio between the target speed at the deceleration start point and target speed set according to the position of the wiper blade.

* * * * *